(12) United States Patent
Voss

(10) Patent No.: US 11,947,386 B1
(45) Date of Patent: Apr. 2, 2024

(54) ELECTRONIC DEVICE SCREEN PERSONALIZATION

(71) Applicant: X Group, LLC, Park City, UT (US)

(72) Inventor: Michael Voss, Park City, UT (US)

(*) Notice: Subject to any disclaimer, the term of this patent is extended or adjusted under 35 U.S.C. 154(b) by 0 days.

(21) Appl. No.: 18/327,706

(22) Filed: Jun. 1, 2023

(51) Int. Cl.
*G06F 1/16* (2006.01)

(52) U.S. Cl.
CPC .... *G06F 1/1626* (2013.01); *G06F 2200/1634* (2013.01)

(58) Field of Classification Search
CPC ........................................ G06F 1/1626
See application file for complete search history.

(56) References Cited

U.S. PATENT DOCUMENTS

| | | | | |
|---|---|---|---|---|
| 8,638,549 B2* | 1/2014 | Garelli | ............... | G06F 1/181 |
| | | | | 361/679.55 |
| 9,001,507 B2* | 4/2015 | Kim | ............... | H04M 1/0283 |
| | | | | 361/679.55 |
| 10,620,670 B2* | 4/2020 | Wilson | ............ | G06F 3/0412 |
| 10,805,440 B1* | 10/2020 | Pham | ............. | H04M 1/22 |
| 11,001,095 B2* | 5/2021 | Hyvönen | ......... | B32B 17/06 |
| 11,016,538 B2* | 5/2021 | Lange | .............. | G06F 1/1656 |
| 11,119,533 B1* | 9/2021 | Harris | ............. | B32B 27/06 |
| 2010/0128204 A1* | 5/2010 | Omote | ............ | B32B 27/286 |
| | | | | 349/86 |
| 2010/0309152 A1* | 12/2010 | Kusuda | ........... | G06F 1/1626 |
| | | | | 345/173 |
| 2011/0255227 A1* | 10/2011 | Murakami | ....... | B32B 27/302 |
| | | | | 29/829 |
| 2011/0299168 A1* | 12/2011 | Combs | ............ | G02B 1/11 |
| | | | | 359/601 |
| 2019/0050025 A1* | 2/2019 | Wilson | ............ | G06F 3/041 |
| 2019/0241013 A1* | 8/2019 | Hyvönen | ......... | B32B 7/06 |
| 2020/0371560 A1* | 11/2020 | Lange | ............. | H05K 5/0256 |
| 2021/0286405 A1* | 9/2021 | Harris | ............. | G02B 1/14 |

* cited by examiner

*Primary Examiner* — Lisa Lea-Edmonds
(74) *Attorney, Agent, or Firm* — Miller IP Law; Devin Miller

(57) ABSTRACT

Described herein are examples of devices, methods, and systems for applying screen features to a screen protector and/or an electronic display screen for smart devices or other electronic device with electronic display screens. The screen feature can be selected by a user, chosen from words, images, shapes, patterns, colors, designs, or logo. The screen feature is visible when the electronic display is in a powered-off state, and invisible when the electronic display is a powered-on state.

16 Claims, 5 Drawing Sheets

ELECTRONIC DEVICE SCREEN PERSONALIZATION

BACKGROUND

Screen protectors for electronic devices such as smart phones, tablets, television screens, and any device with a visual display are well known in the electronics industry. Typically, screen protectors provide scratch resistance for glass or glass-like screens and can have a gloss, matte, or satin finish. Additionally, screen protectors are known to provide difficulty for indirect viewing of electronic devices, such as to restrict third parties from viewing information "over the shoulder" of a smart device user.

BRIEF DESCRIPTION OF THE DRAWINGS

The present description will be understood more fully when viewed in conjunction with the accompanying drawings of various examples of smart device screen personalization. The description is not meant to limit the smart device screen personalization and variables to the specific examples. Rather, the specific examples depicted and described are provided for explanation and understanding of smart device screen personalization and variables. Throughout the description the drawings may be referred to as drawings, figures, and/or FIGs.

DETAILED DESCRIPTION

Figure 1:
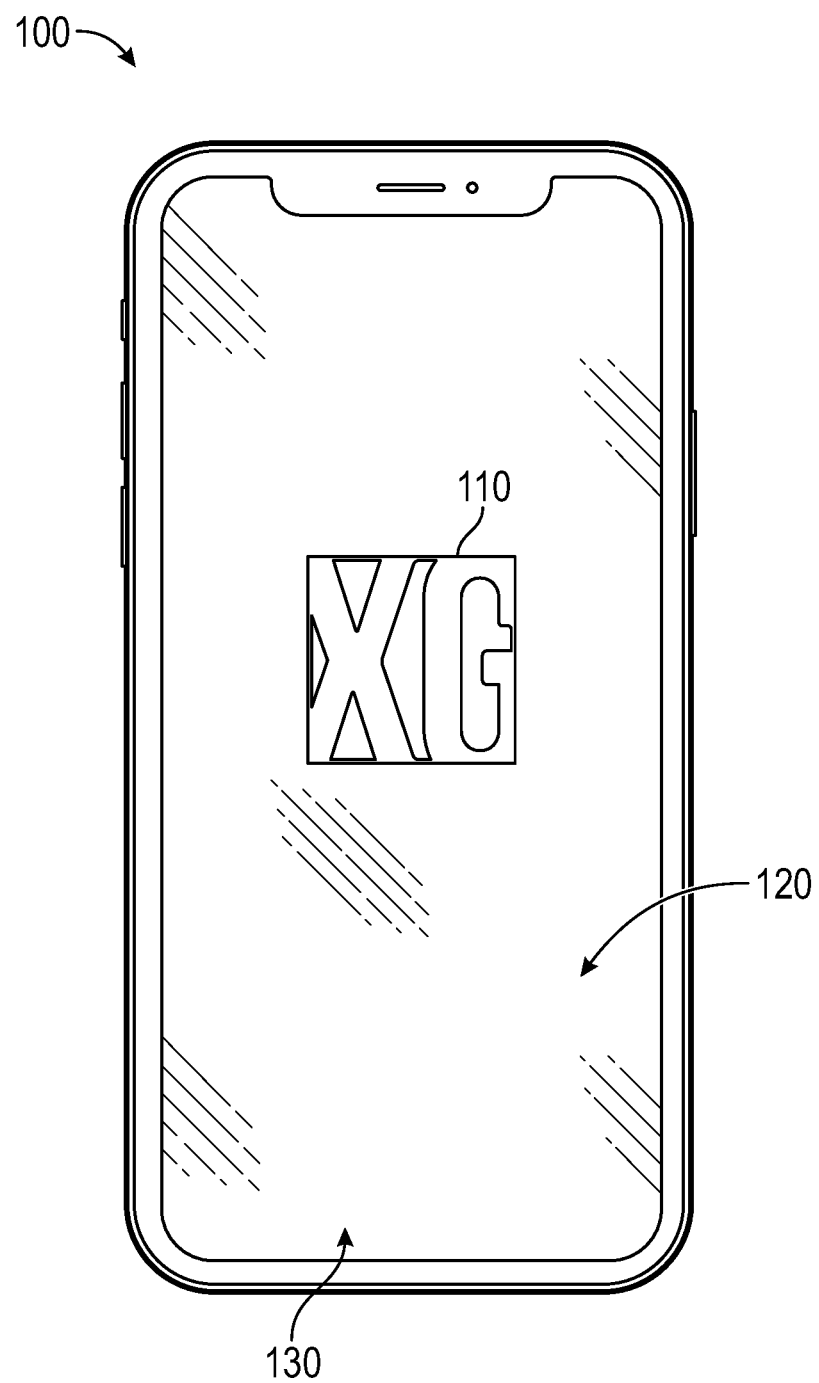
FIG. 1 illustrates smart device in the powered-off state displaying the screen feature, according to an embodiment.

Smart device screen personalization as disclosed herein will become better understood through a review of the following detailed description in conjunction with the figures. The detailed description and figures provide merely examples of the various embodiments of smart device screen personalization. Many variations are contemplated for different applications and design considerations; however, for the sake of brevity and clarity, all the contemplated variations may not be individually described in the following detailed description. Those skilled in the art will understand how the disclosed examples may be varied, modified, and altered and not depart in substance from the scope of the examples described herein.

A conventional screen protector can be prepared from thin films that are generally prepared from polyethylene terephthalate (PET) and thermoplastic polyurethane (TPU). Additionally, screen protectors can be prepared from more rigid materials such as tempered glass or hard plastics. Generally, screen protectors are applied to visual display screens of electronic devices to protect the glass or glass-like display from scratches, shattering, and/or breakage. Screen protectors can also be applied to reduce glare and/or to reduce the angle from which onlookers can view information on a display screen.

Screen protectors lack the ability to personalize the display area of an electronic device when the electronic device is turned off or powered down. There are numerous products and methods for decorating the back side (the side opposite the display screen) of smart phones, tablets and similar devices. Additionally, many people utilize smart phone cases (as well as tablet cases) that can provide personalization on the back side of the device. These devices do not provide personalization to the screen of the electronic device because it would obscure the visual display when the device is turned on.

Implementations of devices, methods and systems for personalizing a screen protector or an electronic screen surface can address some or all of the problems described above.

Embodiments of screen protector personalization can include devices, methods and systems that employ screen print applications and/or physical vapor deposition to apply an image, design, logo, color or other screen feature to a screen protector or a display screen of an electronic device.

Embodiments of screen printing can be configured to apply a screen feature to a screen protector or display screen at a limited dot per square inch (DPI) that allow a user to view the screen feature when the electronic device is turned off, but do not render the screen feature visible when the electronic device is turned off. The brightness of the electronic display, generally a liquid crystal display (LCD) renders the low DPI screen feature invisible when the electronic display is turned on.

Embodiments of physical vapor deposition (PVD) can be configured to apply a nanometer thin layer to the screen protector or display screen that allow a user to view the screen feature when the electronic device is turned off, but render the screen feature invisible when the LCD (or other display system) is turned on.

FIG. 1 illustrates a powered-off (or down or turned off) smart device 100 with a screen feature 110, according to an embodiment. The smart device 100 illustrated in FIG. 1 is a smart phone with a display screen 120 that encompasses the majority of the display side 130 of the smart device 100. Modern smart phones have display screens that encompass greater than 90% of the display side 130 of the smart device 100, and often greater than 95% of the display side 130 of the smart device 100. The screen feature 110 illustrated in FIG. 1 is a stylized logo employing the letters "LC" inside a circle. The screen feature 110 can be any logo, word, shape, image, design or feature chosen by the user to personalize the display screen 120 of the smart device 100.

Embodiments, include a smart device comprising an electronic display screen, wherein the smart device further comprises a screen protector configured to be applied to the electronic display screen. The screen protector is configured to receive a screen feature. The screen feature is selected by a user, and the screen feature is selected from the group including words, images, shapes, patterns, colors, designs, or logo. Additionally, the screen feature is visible when the electronic display is in a powered-off state, and invisible when the electronic display is a powered-on state. More specifically, the screen feature is visible when the electronic display is in a powered-off state via reflection and/or absorption of ambient light from the screen feature allowing the user to view the screen feature, and the screen feature is invisible when the electronic display is a powered-on state via the brightness of the light emitted from the display screen hiding the screen feature from the vision of the user. The screen feature is visible when the electronic display is in a powered-off state or in sleep mode via reflection of ambient light from the screen feature allowing the screen feature to be visible to the user, and the screen feature is invisible when the electronic display is in a powered-on state via the brightness of the light emitted from the display screen hiding the screen features from the vision of the user.

The screen protector is generally prepared from a transparent material that can be selected from polyethylene terephthalate (PET) and thermoplastic polyurethane (TPU). Additionally, screen protectors can be prepared from more rigid materials such as tempered glass or hard plastics. The material employed for the screen protector should be rigidly flexible to protect the display screen. Additionally, materials employed should be able to be printed on or allow for deposition. The material can be configured to accept printing and/or the material can be configured to accepted deposition. Additionally, the screen protector is prepared and/or treated with an adhesive coating to apply the screen protector to the display screen. Embodiments include tempered glass or rigid plastic screen protectors that have a thickness of 0.06 mm to 1 mm, and between 0.05 mm and 2 mm, for plastic film screen protector substrates.

Figure 2:
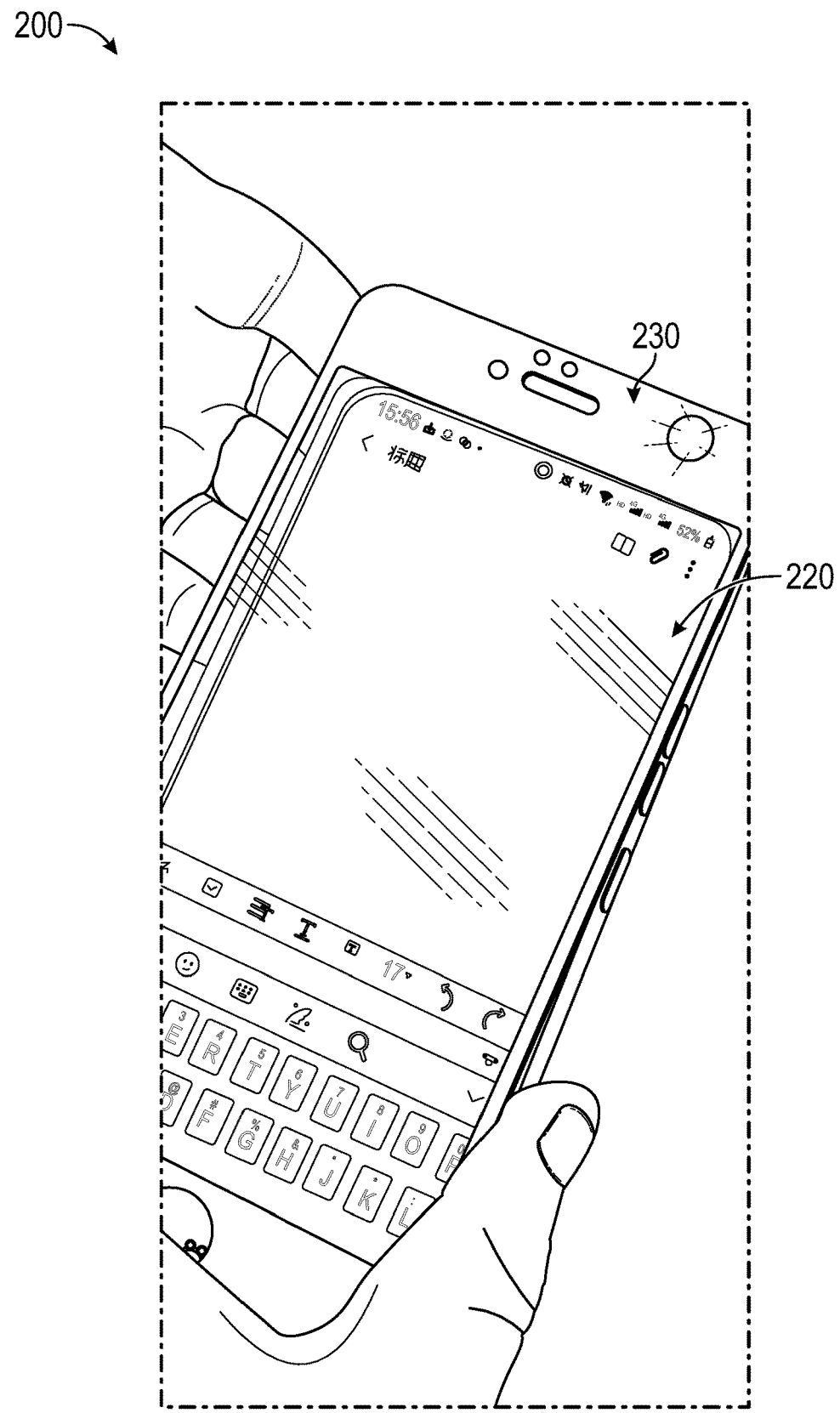
FIG. 2 illustrates a smart device in the powered-on state, not displaying the screen feature, according to an embodiment.

FIG. 2 illustrates a powered-on (or turned on) smart device 200 without a visible screen feature, according to an embodiment. As illustrated in FIG. 2, when the electronic display (generally an LCD display) is turned on, the brightness of the electronic display renders the screen feature invisible and allows the user to view the display screen 220 without the screen feature obstructing the display screen. The low DPI of the print application using screen printing, digital printing, flexographic, rotogravure or lithographic printing allow the screen feature 110 to be visible when the electronic display is turned off (as illustrated in FIG. 1), but invisible when the electronic display is turned on (as illustrated in FIG. 2). In one embodiment, the screen feature is applied to allow for electronic device light to be emitted through the graphic due to the evenly dispersed metal particles, ink, or pigment which allows the viewer to see the screen image if the device is in a powered-on state and illuminated. If the device is powered off or in sleep mode, the screen feature is visible due to the naturally dark background of the electronic device as the black or dark background of the device allows the human eye to fill in the space between the dots of ink, pigment, or toner.

Embodiments of the screen protector and/or screen can be prepared that provide privacy and/or security for the user. The screen feature(s) can be configured to reduce and/or eliminate the ability of third-parties or on-lookers from viewing the display screen from non-direct angles. For examples, an on-looker trying to view the display screen from an angle greater than 28 degrees, greater than 45 degrees, and/or greater than 60 degrees will only be able to view the screen feature (which can obscure the entire display screen or a portion of the display screen) thereby eliminating the on-looker from viewing the display screen when the device is powered-on or only seeing the screen feature image or text. This can be used for general privacy of the user, as well as security for highly confidential material, or to display specific imagery, colors, artwork, or text to the on-looker. The security is provided because when the angle at which the display screen is viewed at increases (0-degree angle being a direct head on view of display screen) the opportunity for the screen printing and/or physical vapor deposition to obstruct the light from the display screen increases. Beyond a set angle, such as 28 or 30 degrees, the display screen will become opaque and only the screen feature will be viewable thereby blocking the display screen from on-lookers.

In embodiments in which the screen feature is applied to the screen protector between 200 and 600 DPI, the screen feature can provide privacy protection to the user via blocking viewers from non-direct angles of the display screen. In embodiments where the non-direct angle is an angle greater than 28 degrees and a DPI between 200 and 600, the screen feature allows light from the display screen to be visible to the direct user, renders the screen feature invisible to the user, and renders the display screen opaque to the non-direct viewer.

Figure 3:
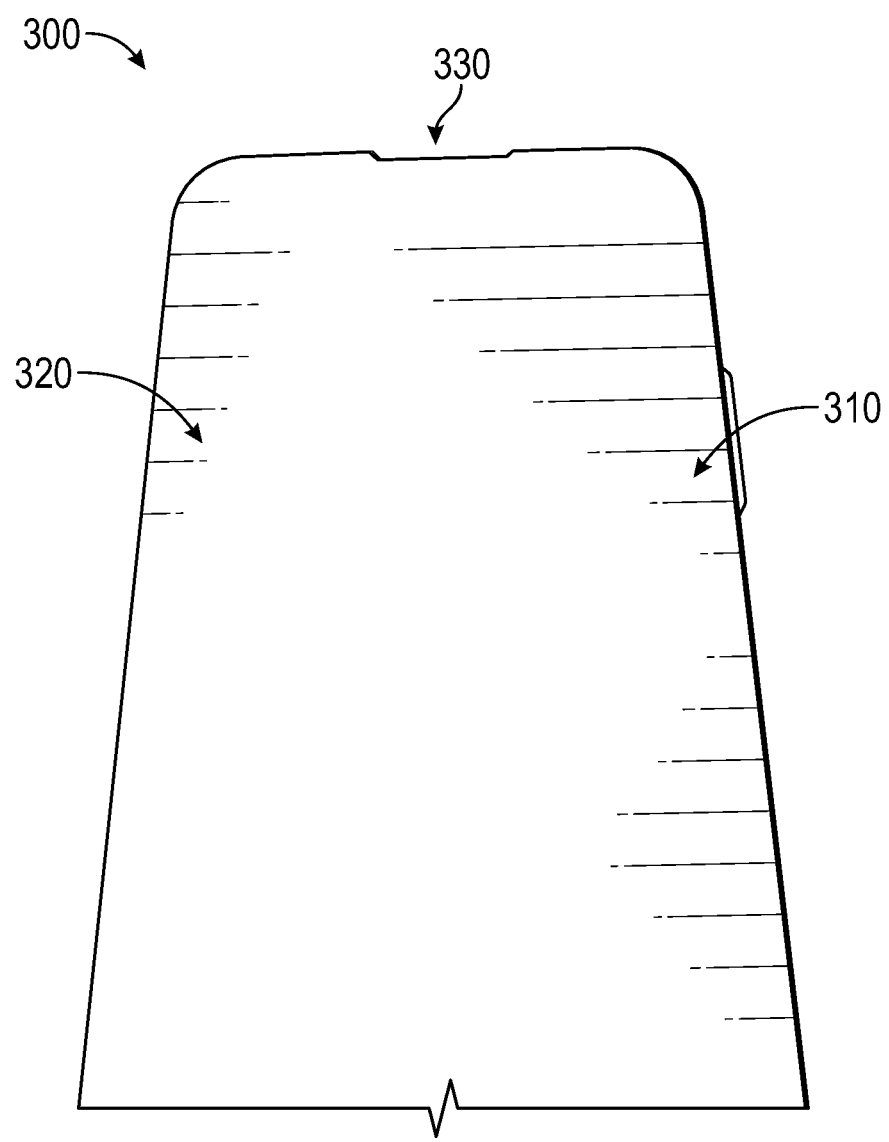
FIG. 3 illustrates a smart device in the powered-off state, displaying a screen feature across the entire display screen of the smart device, according to an embodiment.

FIG. 3 illustrates a smart device 300 with a screen feature 310 that encompasses the entire display screen 320, according to an embodiment. The screen feature 310 illustrated in FIG. 3 is a color, such as gold, silver, red, blue, green or other color of choice, that is visible over the entire display screen 320. Filling the entire area of the screen protector with a pure metal, alloy, nitride, oxide, or carbide allows for the user to see themselves within the screen protector. By filling the entire area via PVD or similar vacuum electroplating process using a color of silver, red, green, blue, other colors, a mirror finish is achieved to allow for the user to see themselves within the screen protector and electronic device. This mirror effect is beneficial for discrete cosmetic uses to ensure personal appearance meets personal expectations. The smart device 300 illustrated in FIG. 3 has a display screen that runs to the edges of the display screen 320 and therefore the screen feature appears to cover the entire display side 330 of the smart device 300.

Figure 4:
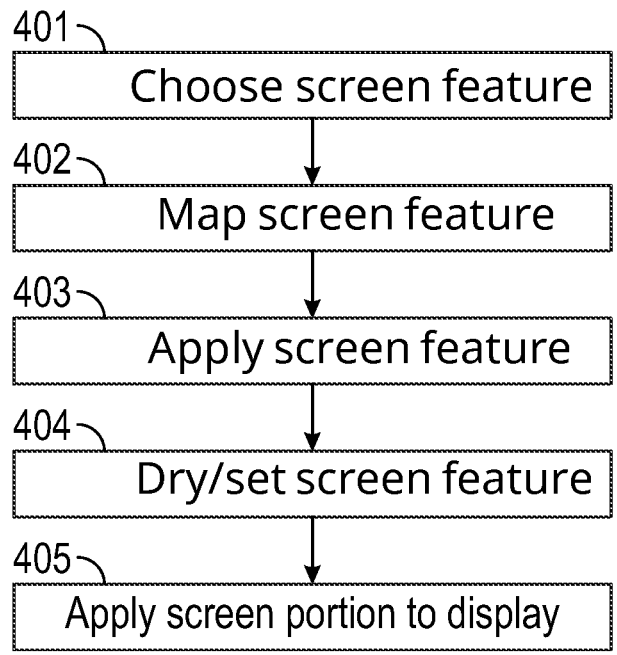
FIG. 4 illustrates a flow chart of a method of applying a screen feature via screen printing, according to an embodiment.

FIG. 4 illustrates a block chart 400 describing the steps for screen printing of a screen feature to a screen protector, according to an embodiment. In step 401 the screen feature is chosen by the user. In step 402 the screen feature is mapped by a software application that translates the screen feature into a design to be applied to a screen protector. In step 403 the design is applied to the screen protector (or directly to the display screen) at a DPI between 200 and 600 DPI, between 300 and 500 DPI, and/or between 400 and 450 DPI. Embodiments can include 420 DPI for the screen feature. In embodiments, the screen feature is added to the screen protector at a DPI of 420. The screen feature is printed onto or applied to the screen protector using techniques commonly employed for printing on clear and/or opaque plastic films. The printing material can be selected from ink, metals (or metal particles), pigments, UV ink, dye, aqueous solvent, eco solvent, toner, print paste, thermochromic or photochromic ink. In step 404 the screen protector is dried or set via conventional techniques allowing the screen feature to be permanently incorporated onto the screen protector. In step 405 the screen protector is applied to the display screen of an electronic device.

The screen feature can be applied to the side of the screen protector that is applied to the display screen or the screen feature can be applied to the side of the screen protector that is opposite the display screen and faces the user. In an embodiment the screen feature is on the side of the screen protector engaged with the display screen. This avoids deterioration of the screen print application from general wear and tear of the smart device and/or touch contact by the user.

Embodiments include methods and systems including applying a screen feature to a screen protector, wherein the screen protector is configured to be applied to an electronic display screen. The screen feature is applied to the screen protector via the steps of selecting a screen feature by a user; mapping the screen feature via a software application to translate the screen feature into a design to be applied to the screen protector; applying the design to the screen protector; drying the applied design to permanently incorporate the screen feature onto the screen protector; and applying to screen protector to the electronic display screen of an electronic device. The screen feature is visible when the electronic display screen is in a powered-off state, and invisible when the electronic display screen is a powered-on state.

Figure 5:
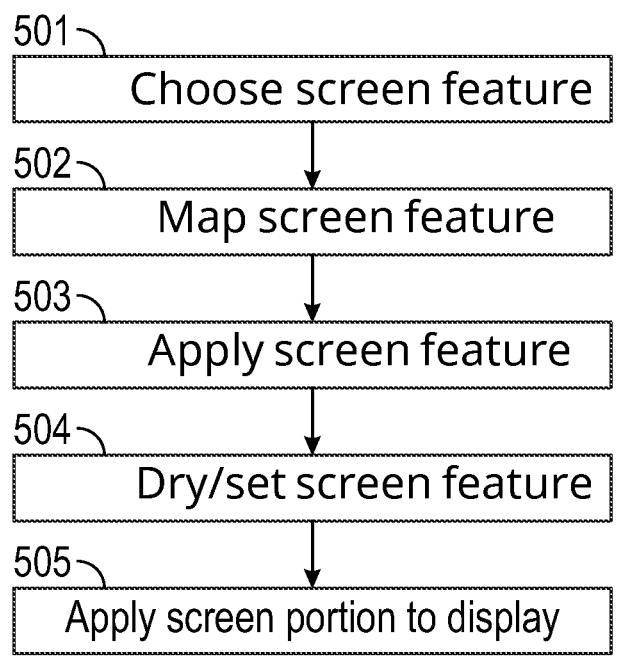
FIG. 5 illustrates a flow chart of a method of applying a screen feature via physical vapor deposition, sputtering, or vacuum metal deposition according to an embodiment.

FIG. 5 illustrates a block chart 500 describing the steps for physical vapor deposition of a screen feature onto a screen protector, according to an embodiment. In step 501 the screen feature is chosen by the user. In step 502 the screen feature is mapped by a software application that translates the screen feature into a design to be applied to a screen protector. In step 503 the screen feature is applied to the screen protector (or directly to the display screen) at a thickness between 0.001 microns and 600 microns, preferably between 0.001 microns and 400 microns, and most preferably between 0.001 microns and 200 microns. Embodiments can include a thickness between 0.001 microns and 400 microns for the screen feature. In physical vapor deposition the screen feature is applied to the screen protector using techniques commonly employed for physical vapor deposition onto clear and/or opaque plastic films. The physical vapor deposition process can also be accomplished by electrolysis or sputtering of metallic components onto a substrate. The material to be applied to the screen protector can be selected from pure metals, elements, alloys, or compounds such as oxides or nitrides, pigments. In embodiments, the screen protector (or substrate) can be treated with chemicals, or electric conductive thin layers in the pattern/shape/design of the screen feature to attract the metallic material during the physical vapor deposition (or sputtering/electrolysis/electroplating process). In step 504 the screen protector is dried via conventional techniques allowing the screen feature to be permanently incorporated onto the screen protector. In step 505 the screen protector is applied to the display screen of an electronic device. Embodiments of the physical vapor deposition can be done at temperatures ranging from 70° C. to 600° C., preferably from 70° C. to 400° C., and most preferably at 250° C. Equipment for physical vapor deposition includes in-line sputtering systems, batch sputtering equipment, roll-to-roll vacuum coating equipment.

The display screen can be the display screen of a smart device, such as a smart phone, smart watch, smart thermostat, or tablet. Alternatively, the display screen can be a television or monitor used for display purposes in a retail environment or for home decoration. Embodiments can be applied to display screens for digital registers at check-out locations in retail environments. The display screen can be any digital screen that can be turned off and has a high brightness when turned on to render the screen feature invisible.

Figure 6:
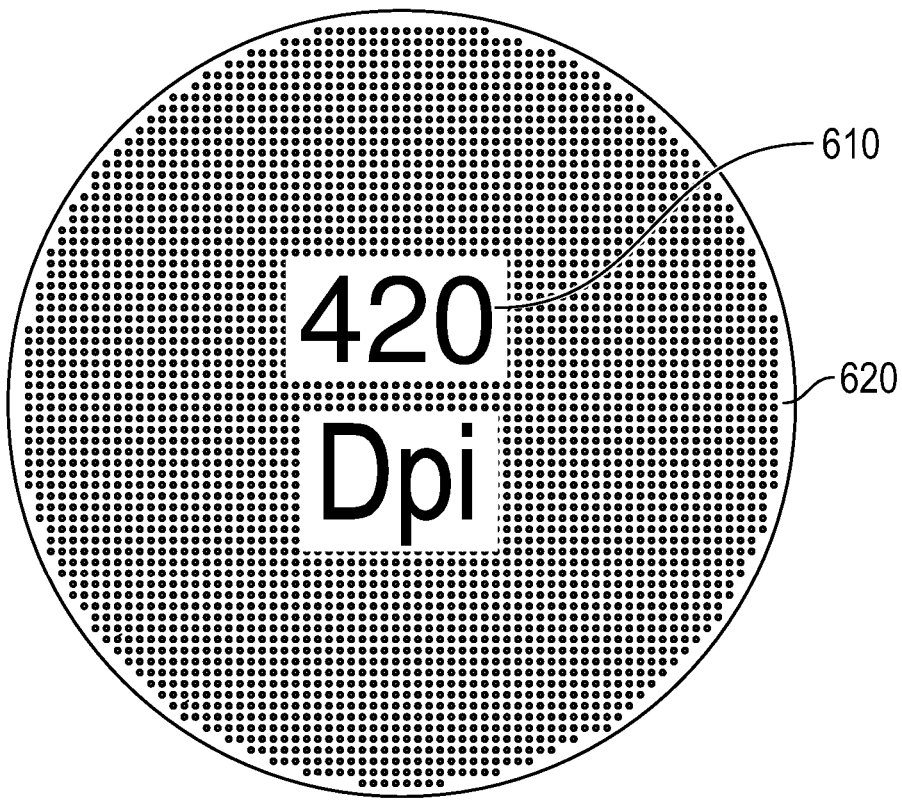
FIG. 6 illustrates a screen feature with 300 DPI, according to an embodiment.

FIG. 6 illustrates a screen printing at 420 DPI, according to an embodiment. The DPI is important to the ability of the user to view the screen feature 610 on the display screen 620 because the human eye cannot view and/or distinguish the printing at or around that spacing level when the bright light of display screen 620, such as an LCD or OLED screen is turned on. As the screen is powered-on the user's eyes are focused on the light emitted from the electronic device and the light projects onto the users retina which provides the user the ability to view the electronic device screen without obstruction and without ability to view the screen feature. The spacing of DPI may be determined using a silk screen, print rollers, print plates, or computer programing for digital printing to specify the DPI. The human eye can only detect DPI of 170 DPI or less, so with DPI ranging from 200 DPI-600 DPI, humans view the screen feature image as a complete image or graphic rather than an array of dots when the screen is in a powered-off state. In the powered-off state of the device, the black or dark screen allows the screen feature to appear more defined due to the solid and dark background. The range of DPI of 200-600 DPI allows the electronic device's screen's brightness to pass through for on-screen device image visibility, but more dots per square inch (DPI) would cause the screen feature to appear visible while the screen is powered-on.

Figure 7:
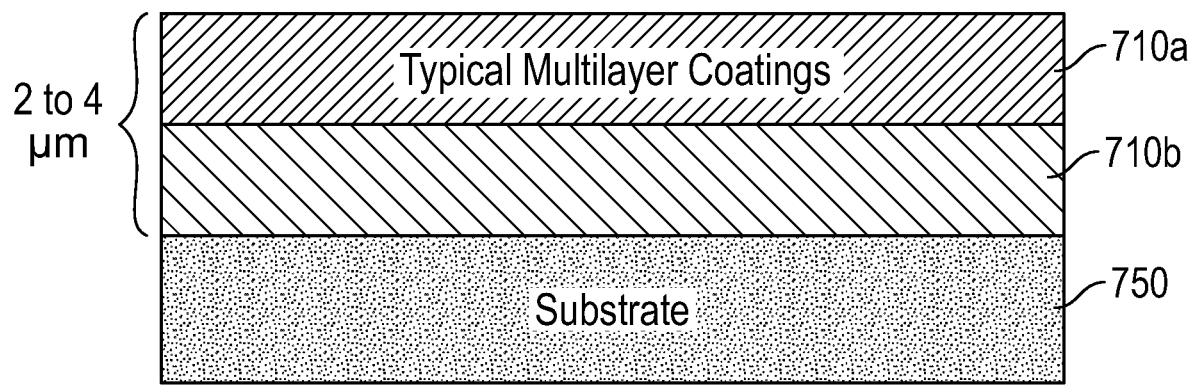
FIG. 7 illustrates a screen feature with a thickness of 150 according to an embodiment.

FIG. 7 illustrates physical vapor deposition on a screen or screen protector, according to an embodiment. The embodiment illustrated displays a multi-layer coating (710a and 710b) at a coating thickness of 150 µm (microns). The coating layer can be between 0.001 microns and 600 microns, between 0.001 microns and 200 microns, and can be in a single layer, two layers, three layers, or more layers. The substrate 750 can be the screen protector or the display screen. The layering of particles by physical vapor deposition creates a thickness layer that will allow bright light from the display screen 720 (not shown) to shine through the screen feature(s) 710a and 710b. Different thickness levels can be employed. The greater the thickness of the physical vapor deposition the less light can penetrate from the display device. At certain levels, the ambient light (not light from the device) will be reflected and/or absorbed by the particles applied by the physical vapor deposition and will display the screen feature(s) 710a and 710b that has been applied to the display screen 720.

In one example, the sputtering process may include one or multiple materials being deposited in fine layers using magnetron sputtering. The sputtering process may include introducing an inert gas into a vacuum chamber. The sputtering process may include accelerating the gas using a high voltage applied between a target and a substrate in the presence of a magnetron. This causes the release of atomic particles from the target, which then collide with gas ions to form a solid thin film at random on the screen protector substrate. In another example, e-beam evaporation and/or other a variations of PVD may include a physical process where the target material is heated to a high vapor pressure by bombarding it with electronics in a high vacuum. The released particles are accelerated by creating a plasma with gas molecules inserted into the reactor, leading to the deposition of compressed layers on the substrate. For PVD or vacuum electroplating, the particles may be deposited onto the screen protector at random but become evenly spaced and layered to allow light from the electronic device to pass through.

Embodiments include systems and methods including applying a screen feature to an electronic display screen, including selecting a screen feature by a user; mapping the screen feature via a software application to translate the screen feature into a design to be applied to the electronic display screen; applying the design to the electronic display screen; and drying the applied design to permanently incorporate the screen feature onto the electronic display screen. The screen feature is visible when the electronic display screen is in a powered-off state, and invisible when the electronic display screen is a powered-on state.

The screen feature can be in the form or words, logos, shapes, designs, colors, text, symbols, patterns, or other features chosen by the user. The screen feature can be a brand such as a highly recognizable logo, for example Chanel, Nike, or Louis Vuitton, or a sports team logo such as the New York Yankees logo (interlocking NY and Y), the Miami Dolphins animal logo (a dolphin), or a blue lightning bolt for the Tampa Bay Lightning. The screen feature can be a positive image shaped by the screen printing or physical vapor deposition, or the screen feature can be a negative space framed by the screen printing or vapor deposition. Multiple colors can be employed in the screen feature in embodiments. One distinction between the screen printing and the physical vapor deposition is that the screen printing relies on filled text, shapes, or graphics and negative space to render the screen feature, while the physical vapor deposition can cover the entire surface of the screen protector (or the screen display). Additionally, the richness or deepness of the color of the screen feature as employed with physical vapor deposition can be enhanced by increasing the thickness of the deposition. The thickness becomes limited to around 600 microns because it begins to block visibility of the display when turned on and thicker layers of metals can cause disruption with touch screens. Variations in color and thickness are envisioned by the present invention.

Embodiments include screen features including sports logo and apparel trademarks. Additionally, the screen feature can be viewable in the positive space applied to the electronic display screen or viewable in the negative space created by the screen feature on the electronic display screen.

Embodiments of the screen feature, particularly screen features applied via physical vapor deposition can cover greater than 80%, greater than 90%, greater than 95% and approximately 100% of the screen protector or electronic display screen. These embodiments can be a solid color, such as a metallic silver or gray that allows the display screen to act as a mirror to allow a user to see their own reflection when the electronic device is in the powered-off state.

A feature illustrated in one of the figures may be the same as or similar to a feature illustrated in another of the figures. Similarly, a feature described in connection with one of the figures may be the same as or similar to a feature described in connection with another of the figures. The same or similar features may be noted by the same or similar reference characters unless expressly described otherwise. Additionally, the description of a particular figure may refer to a feature not shown in the particular figure. The feature may be illustrated in and/or further described in connection with another figure.

Elements of processes (i.e. methods) described herein may be executed in one or more ways such as by a human, by a processing device, by mechanisms operating automatically or under human control, and so forth. Additionally, although various elements of a process may be depicted in the figures in a particular order, the elements of the process may be performed in one or more different orders without departing from the substance and spirit of the disclosure herein.

The foregoing description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

Related elements in the examples and/or embodiments described herein may be identical, similar, or dissimilar in different examples. For the sake of brevity and clarity, related elements may not be redundantly explained. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

It is to be understood that the foregoing description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples.

The Applicant(s) reserves the right to submit claims directed to combinations and sub-combinations of the disclosed examples that are believed to be novel and non-obvious. Examples embodied in other combinations and sub-combinations of features, functions, elements and/or properties may be claimed through amendment of those claims or presentation of new claims in the present application or in a related application. Such amended or new claims, whether they are directed to the same example or a different example and whether they are different, broader, narrower or equal in scope to the original claims, are to be considered within the subject matter of the examples described herein.

The invention claimed is:

1. A device, comprising:
    a smart device comprising an electronic display screen,
        wherein the smart device further comprises a screen protector configured to be applied to the electronic display screen,
        wherein the screen protector:
            is prepared from a flexible transparent material;
            is configured with an adhesive coating to apply the screen protector to the electronic display screen;
            provides protection to the electronic display screen; and
            is configured to receive a screen feature; and
            wherein:
                the screen feature is selected by a user, and
                the screen feature is selected from the group including words, images, shapes, patterns, colors, designs, or logo,
        wherein the screen feature is:
            visible when the electronic display is in a powered-off state via reflection of ambient light from the screen feature allowing the screen feature to be visible to the user;
            invisible when the electronic display is in a powered-on state via brightness of the light emitted from the electronic display screen hiding the screen features from the user's vision;
            configured to be applied to the screen protector via physical vapor deposition; and
            is applied at a thickness of 0.001 to 600 microns, wherein a thickness of 0.001 to 600 microns:
                allows light from the electronic display screen to be visible to the user; and
                renders the screen feature invisible to the user.

2. The device of claim 1, wherein:
the screen feature is configured to be applied to the screen protector via screen printing; and
the screen feature is applied between 200 and 600 DPI;
    wherein a DPI between 200 and 600:
        allows light from the electronic display screen to be visible to the user; and
        renders the screen feature invisible to the user.

3. The device of claim 2, wherein:
the screen feature is applied to the screen protector between 300 and 500 DPI; and
the screen feature provides privacy protection to the user via blocking viewers from non-direct angles of the electronic display screen;
    wherein a DPI between 300 and 500:
        allows light from the electronic display screen to be visible to the user; and
        renders the screen feature invisible to the user.

4. The device of claim 3, wherein:
the screen feature comprises pigments, ink, or metal applied to the screen protector; and
the screen protector is prepared from polyethylene terephthalate or thermoplastic polyurethane.

5. The device of claim 1, wherein:
the screen feature is configured to be applied to the screen protector at a thickness of 0.001 to 200 microns:
    wherein a thickness of 0.001 to 200 microns:
        allows light from the electronic display screen to be visible to the user; and
        renders the screen feature invisible to the user.

6. The device of claim 5, wherein:
the screen feature comprises metals applied via electrolysis; and
the screen protector is prepared from tempered glass.

7. A method, comprising:
applying a screen feature to a screen protector, wherein:
    the screen protector:
        is configured to be applied to an electronic display screen;
        is prepared from a flexible transparent material;
        is configured with an adhesive coating to apply the screen protector to the electronic display screen;
        provides protection to the electronic display screen; and
        is configured to receive a screen feature comprising metal particles; and
    the screen feature is applied to the screen protector by:
        selecting a screen feature by a user;
        mapping the screen feature via a software application to translate the screen feature into a design to be applied to the screen protector;
        applying the design to the screen protector;

drying the applied design to permanently incorporate the screen feature onto the screen protector; and
applying to screen protector to the electronic display screen of an electronic device,
wherein the screen feature is:
visible when the electronic display is in a powered-off state via reflection of ambient light from the screen feature allowing the screen feature to be visible to the user;
invisible when the electronic display is in a powered-on state via brightness of the light emitted from the electronic display screen hiding the screen features from the user's vision;
applied to the screen protector between 400 and 450 DPI, wherein a DPI between 400 and 450:
allows light from the electronic display screen to be visible to the direct user;
renders the screen feature invisible to the user; and
renders the electronic display screen opaque to the non-direct viewer; and
configured to provide privacy protection to the user via blocking viewers from non-direct angles of the electronic display screen, wherein a non-direct angle is an angle greater than 45 degrees.

8. The method of claim 7, wherein:
the screen feature is applied to a side of the screen protector that is applied directly to the electronic display screen of the electronic device; and
the screen feature is applied via screen printing comprising ink, pigments, or metal.

9. The method of claim 7, wherein:
the screen feature is applied via physical vapor deposition, and
the screen feature is applied at a thickness between 0.001 microns and 600 microns;
wherein a thickness of 0.001 to 600 microns:
allows light from the electronic display screen to be visible to the user; and
renders the screen feature invisible to the user.

10. The method of claim 9, wherein:
the screen feature is a color applied to greater than 90% of the screen protector, and
the screen feature has a thickness between 0.001 microns and 200 microns.

11. A device, comprising:
an electronic display screen;
a screen protector configured to be applied to the electronic display screen, wherein the screen protector:
comprises a transparent material;
comprises a coating configured to apply the screen protector to the electronic display screen; and
is configured to receive a screen feature, wherein:
the screen feature comprises a word, an image, a shape, a pattern, a color, a design, or a logo,
visible when the display is in a powered-off state allowing the screen feature to be visible to the user;
invisible when the electronic display is in a powered-on state hiding the screen features from the user's vision;
is applied at a thickness of 0.001 to 600 microns, wherein a thickness of 0.001 to 600 microns;
the screen feature is applied via physical vapor deposition; and
the screen feature is applied at a thickness between 0.001 and 200 microns.

12. The device of claim 11, wherein:
the electronic display screen comprises tempered glass; or
the screen feature comprises metals particles.

13. A device, comprising:
an electronic display screen;
a screen protector configured to be applied to the electronic display screen, wherein the screen protector:
comprises a transparent material;
comprises a coating configured to apply the screen protector to the electronic display screen; and
is configured to receive a screen feature, wherein:
the screen feature comprises a word, an image, a shape, a pattern, a color, a design, or a logo,
visible when the display is in a powered-off state allowing the screen feature to be visible to the user;
invisible when the electronic display is in a powered-on state hiding the screen features from the user's vision;
is applied at a thickness of 0.001 to 600 microns, wherein a thickness of 0.001 to 600 microns; and
the screen feature is applied via vacuum electroplating.

14. A device, comprising:
an electronic display screen;
a screen protector configured to be applied to the electronic display screen, wherein the screen protector:
comprises a transparent material;
comprises a coating configured to apply the screen protector to the electronic display screen; and
is configured to receive a screen feature, wherein:
the screen feature comprises a word, an image, a shape, a pattern, a color, a design, or a logo,
visible when the display is in a powered-off state allowing the screen feature to be visible to the user;
invisible when the electronic display is in a powered-on state hiding the screen features from the user's vision;
is applied at a thickness of 0.001 to 600 microns, wherein a thickness of 0,001 to 600 microns; and
the screen feature comprises a solid color covering greater than 90% of the electronic display screen.

15. A device, comprising:
an electronic display screen;
a screen protector configured to be applied to the electronic display screen, wherein the screen protector:
comprises a transparent material;
comprises a coating configured to apply the screen protector to the electronic display screen; and
is configured to receive a screen feature, wherein:
the screen feature comprises a word, an image, a shape, a pattern, a color, a design, or a logo,
visible when the display is in a powered-off state allowing the screen feature to be visible to the user;
invisible when the electronic display is in a powered-on state hiding the screen features from the user's vision:
is applied at a thickness of 0.001 to 600 microns, wherein a thickness of 0.001 to 600 microns; and
the screen feature is viewable in positive space applied to the electronic display screen.

16. A device, comprising:
an electronic display screen;
a screen protector configured to be applied to the electronic display screen, wherein the screen protector:

comprises a transparent material;
comprises a coating configured to apply the screen protector to the electronic display screen; and
is configured to receive a screen feature, wherein:
- the screen feature comprises a word, an image, a shape, a pattern, a color, a design, or a logo,
- visible when the display is in a powered-off state allowing the screen feature to be visible to the user;
- invisible when the electronic display is in a powered-on state hiding the screen features from the user's vision;
- is applied at a thickness of 0.001 to 600 microns, wherein a thickness of 0.001 to 600 microns; and
- the screen feature is viewable in negative space created by the screen feature on the electronic display screen.

* * * * *